United States Patent [19]

Tsumanuma et al.

[11] Patent Number: 5,048,923
[45] Date of Patent: Sep. 17, 1991

[54] IMAGE FIBER, IMAGE FIBER PREFORM, AND MANUFACTURING PROCESSES THEREOF

[75] Inventors: Takashi Tsumanuma; Toshiyuki Tanaka; Naoki Shamoto; Katsuyuki Seto, all of Sakura; Kazuo Sanada, Chiba; Kouji Tanaka, Sakura, all of Japan

[73] Assignee: Fujikura, Ltd., Tokyo, Japan

[21] Appl. No.: 502,204

[22] Filed: Mar. 30, 1990

[30] Foreign Application Priority Data

Apr. 7, 1989 [JP] Japan ................................. 1-87063
May 1, 1989 [JP] Japan ................................. 1-112623

[51] Int. Cl.$^5$ ............................................. G02B 6/06
[52] U.S. Cl. .................................. 385/117; 385/124; 385/142; 385/144
[58] Field of Search .......................... 350/96.31, 96.25

[56] References Cited

U.S. PATENT DOCUMENTS

| | | | |
|---|---|---|---|
| 3,785,718 | 1/1974 | Gloge | 350/96.31 |
| 4,184,744 | 1/1980 | Onoda et al. | 350/96.31 |
| 4,185,890 | 1/1980 | Onoda et al. | 350/96.31 |
| 4,210,386 | 7/1980 | Araujo et al. | 350/96.31 |
| 4,647,153 | 3/1987 | Utsumi et al. | 350/96.25 |
| 4,715,695 | 12/1987 | Nishimura et al. | 350/96.31 |

*Primary Examiner*—William L. Sikes
*Assistant Examiner*—Robert E. Wise
*Attorney, Agent, or Firm*—Sprung Horn Kramer & Woods

[57] ABSTRACT

An image fiber preform for use in an image fiber according to the present invention includes a plurality of optical fiber strands, each optical fiber strand including a silica glass core which contains a dopant for increasing a refractive index of the core and a silica glass cladding surrounding the silica glass core, the silica glass cladding containing a fluorine dopant for decreasing a refractive index of the cladding, the cladding having an outer peripheral surface, and a quartz tube in which the optical fibers are closely arranged, wherein the cladding has a concentration of the fluorine dopant which decreases radially outward toward the outer peripheral surface of the cladding. in the present invention, an image fiber prepared from the image fiber preform and fabrication processes for the image fiber preform and the image fiber are provided.

10 Claims, 4 Drawing Sheets

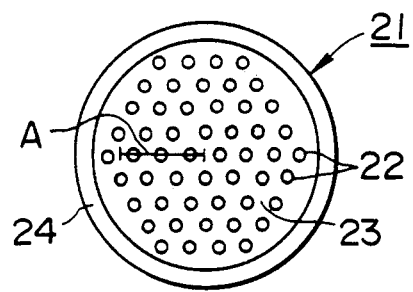
FIG. 5 *(PRIOR ART)*
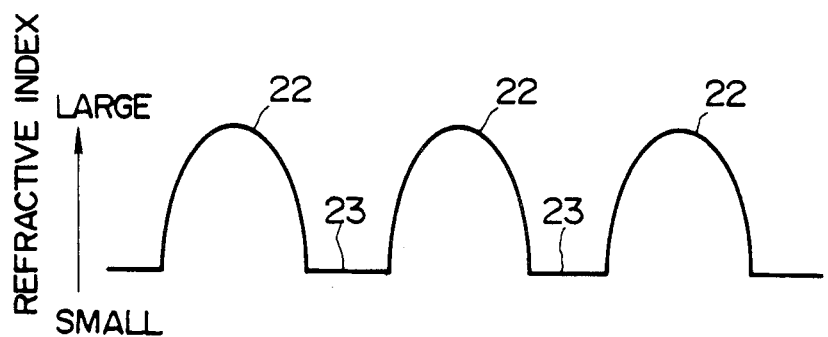
FIG. 6 *(PRIOR ART)*

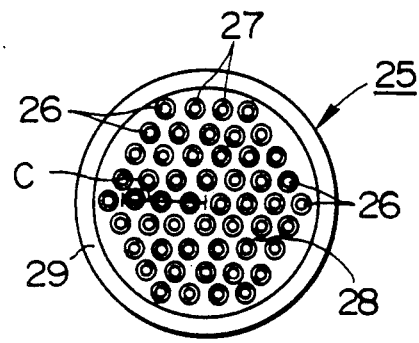
FIG. 7 *(PRIOR ART)*
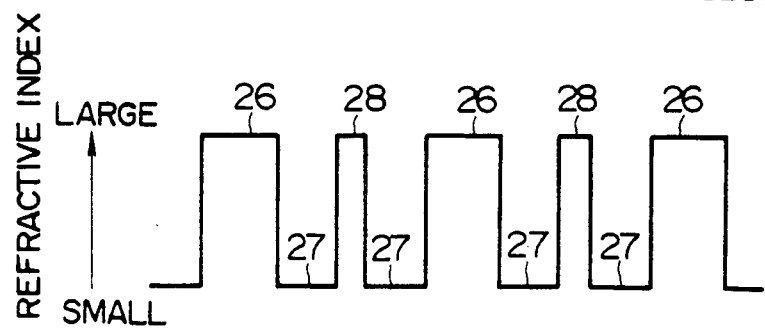
FIG. 8 *(PRIOR ART)*
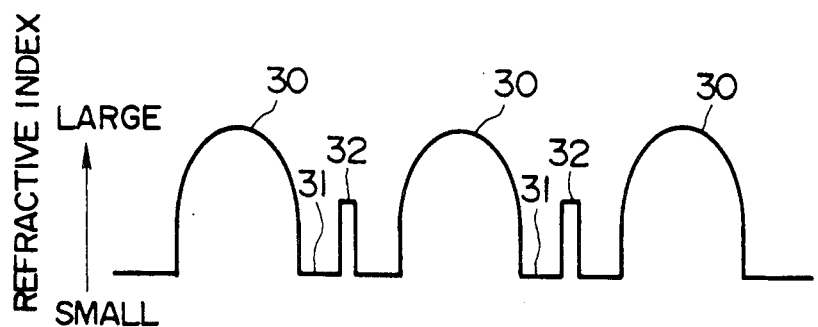
FIG. 9 *(PRIOR ART)*

IMAGE FIBER, IMAGE FIBER PREFORM, AND MANUFACTURING PROCESSES THEREOF

BACKGROUND OF THE INVENTION

1. Field of the Invention

The present invention relates to an image fiber for use in industrial and medical endoscopes and general image transmission systems, as well as a fabrication process thereof. The present invention also relates to an image fiber preform appropriate for use in the image fiber, as well as a fabrication process for the preform.

2. Prior Art

It is well known that an optical fiber strand including a $SiO_2$-glass core having a high refractive index and a $SiO_2$-glass cladding containing fluorine (F) and/or boron oxide ($B_2O_3$) for reducing the refractive index of the cladding may be used in order to obtain the necessary large refractive index difference between the core refractive index and the cladding refractive index, whereby the diameter of the optical fiber may be reduced. For example, when the core diameter is 4 μm and the cladding outer diameter is 6 μm, the relative refractive index difference between the core refractive index and the cladding refractive index needs to be about 4%. A plurality of the above mentioned optical fiber strands, which are arranged closely in a glass tube, are fused by heating from an edge thereof and drawn to form an image fiber.

An example of the fused-type image fibers is shown in FIG. 5. The image fiber 21 is composed of cores 22, a common cladding part 23 disposed between these cores 22, and a jacket 24 which surrounds the common cladding part 23. The image fiber 21 can transmit pictures from one end-face of an objective side to the other end-face of an ocular side through multiple cores 22. The refractive index distribution on the A-part of the cross-section of the image fiber shown in FIG. 5 is indicated in FIG. 6. In general, the refractive index distribution n(r) is calculated by the following equation (1):

$$n(r) = n_0 \{1 - 2\Delta(r/a)^\alpha\}^{\frac{1}{2}} \quad (1)$$

wherein $n_0$ is the refractive index of a center of a core; r is the distance from the center of the core to a random point in the core; a is the radius of the core; Δ is the relative refractive index difference ($\Delta = (n_0 - n_c)/n_0$ wherein $n_0$ is the refractive index of the center of the core and $n_c$ is the refractive index of a cladding); and α is a refractive index distribution constant. For the refractive index distribution, it is known that a step-type refractive index distribution in which the refractive index is constant has a refractive index distribution constant (α) of 5 and more and that a graded-type refractive index distribution in which the refractive index is not constant but parabolically changes has a refractive index distribution constant (α) of about 2.

The image fiber having a refractive index distribution shown in FIG. 6 is composed of cores 22, each core having a graded-type refractive index distribution and a common cladding part 23 having a flat refractive index distribution. The graded-type refractive index distribution of the core 22 has a refractive index distribution constant (α) of about 2. However, since the cladding-glass doped fluorine (F) and/or boron oxide ($B_2O_3$) has a lower softening temperature than the pure silica glass has in this type of image fiber, the cladding glass is dissolved when a plurality of optical fiber strands are arranged and fused, thus causing the array of cores to disarrange. In the case of the cladding-glass doped with fluorine (F), the surface of the cladding is subjected to etching by the fluorine to generate silicon tetrafluoride ($SiF_4$) gas during the melting process. The $SiF_4$ gas forms bubbles which result in decreasing the mechanical strength of the image fiber.

In order to prevent the array of cores from disarranging, it is proposed that an image fiber strands further include support layers disposed at the outer peripheral surface of the claddings are arranged closely in a glass tube and subsequently fused to obtain an image fiber. The support layer, which is a pure silica layer composed of silicon(IV) oxide ($SiO_2$) without dopant, has a higher softening temperature than the cladding has.

An example of the fused-type image fibers mentioned above is shown in FIG. 7. The image fiber 25 is composed of cores 26, cladding parts 27, each cladding part 27 surrounding each core 26, a high refractive index support layer 28 disposed between these cladding parts 27 surrounding the cores 26 and a jacket 29 which surrounds the high refractive index support layer 28. FIG. 8 shows a refractive index distribution on the C-part of the cross-section of the image fiber shown in FIG. 7. Both the core 26 and the high refractive index support layer 8 have respectively step-type refractive index distribution, which has a refractive index distribution constant (α) of about 5 and more.

FIG. 9 shows another example of refractive index distribution of an image fiber having the same structure as the fiber shown in FIG. 7. This image fiber is composed of cores 30, each core 30 having a graded-type refractive index distribution, cladding parts 31, each cladding part 31 surrounding each core 30, and a high refractive index support layer 32 formed between these cladding parts 31 surrounding the cores 30, the support layer 32 having a step-type refractive index distribution.

These image fibers having the refractive index distribution shown in FIGS. 7 and 8 have an advantage that the array of cores is not disarranged. However, in the image fibers, disadvantageously bubbles are generated at the boundary face where the cladding and the high refractive index support layer contact, thus causing to decrease the mechanical strength of the image fibers since the composition of the cladding is extremely different from that of the high refractive index support layer. Furthermore, as the image fibers have step-type high refractive index support layers, unwanted light such as excess incident light and the like adversely diffuse into the core, thus causing deterioration of the contrast of the image fiber.

SUMMARY OF THE INVENTION

It is, therefore, an object of the present invention to provide an image fiber preform for use in a bubble-free and high-strength image fiber.

Another object of the present invention is to provide a process for preparing an image fiber preform.

A further object of the present invention is to provide an image fiber which can be produced from above-mentioned image fiber preform for use in an image fiber that allows pictures to be transmitted with superior contrast by decreasing the unwanted incident light which enters the fiber and by preventing stray light from propagating in the cladding part and adversely diffusing into the core.

It is also an object of this invention to provide a fabrication process for the image fiber.

According to a first aspect of the present invention, there is provided an image fiber preform for use in an image fiber. The preform has a plurality of optical fiber strands arranged closely in a quartz tube. The optical fiber strand comprises a silica glass core which contains a dopant for increasing the refractive index of the core and a silica glass cladding surrounding the silica glass core and having an outer peripheral surface, the silica glass cladding containing fluorine (F) and/or boron oxide ($B_2O_3$) dopant for decreasing the refractive index of the cladding, wherein the cladding has a concentration of the fluorine (F) and/or boron oxide ($B_2O_3$) dopant which decreases radially outward towards the outer peripheral surface of the cladding.

According to a second aspect of the present invention, there is provided a process for preparing an image fiber preform for use in an image fiber, comprising the steps of:

(a) forming a silica glass core which contains a dopant for increasing the refractive index of the core;

(b) subsequently, forming a silica glass cladding which surrounds the silica glass core to form an optical fiber rod, the silica glass cladding being doped uniformly with fluorine for decreasing the refractive index of the cladding;

(c) subsequently, subjecting the optical fiber rod to heat treatment so that the fluorine doped in the outer peripheral surface of the silica glass cladding of the optical fiber rod evaporates;

(d) subsequently, subjecting the optical fiber rod to melt-drawing operation to form an optical fiber strand;

(e) subsequently, preparing a bundle of a plurality of the optical fiber strands; and (f) subsequently, arranging the bundle closely in a quartz tube to form a preform.

Furthermore, according to a third aspect of the comprising cores, cladding parts, each cladding part surrounding each core, and light-shield part disposed between these cladding parts surrounding the cores, wherein the light-shield part has non-step type of refractive index distribution.

Also, according to a fourth aspect of the present invention, there is provided a process for preparing an image fiber, comprising the steps of:

(a) preparing a plurality of optical fiber strands, each optical fiber strand having a core, a cladding part surrounding the core, and a light-shield part surrounding the cladding part, the light-shield part having a refractive index gradually increasing radially outward so that the maximum refractive index thereof is higher than the refractive index of the cladding;

(b) subsequently, arranging closely the optical fiber strands in a quartz tube to form a preform;

(c) subsequently, heating the preform from an edge thereof; and (d) subsequently, subjecting the preform to melt-drawing operation to form an image fiber.

BRIEF DESCRIPTION OF THE DRAWINGS

FIG. 5 is a cross sectional view of a conventional image fiber structure;

FIG. 6 is a schematic representation illustrating a refractive index distribution at an A part shown in FIG. 5;

FIG. 7 is a cross sectional view of a second conventional image fiber structure;

FIG. 8 is a schematic representation illustrating a refractive index distribution at a C part shown in FIG. 7; and FIG. 9 is a schematic representation illustrating a refractive index distribution of a third conventional image fiber having the same structure as shown in FIG. 7.

DESCRIPTION OF THE PREFERRED EMBODIMENTS

Figure 1:
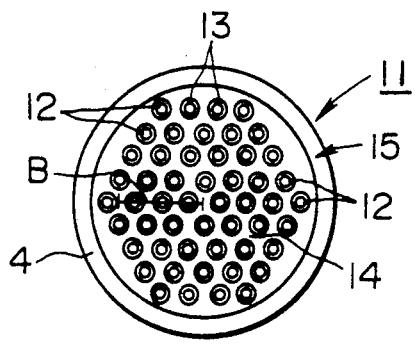
FIG. 1 is a front view of an image fiber according to a preferred embodiment of the present invention.
Figure 2:
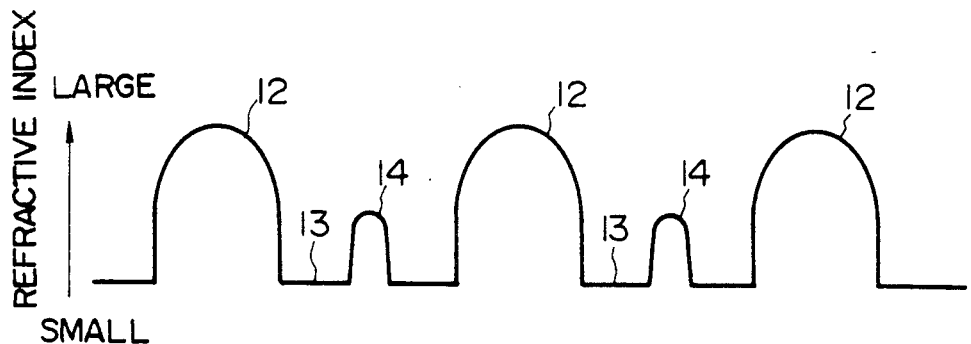
FIG. 2 is a schematic representation illustrating a refractive index distribution at a B part of the image fiber shown in FIG. 1.

An image fiber of a first embodiment according to the present invention is shown in FIG 1. In FIG. 2. a refractive index distribution at a B part of the image fiber shown in FIG. 1 is illustrated.

In FIG. 1, an image fiber 11 is composed of a jacket 4 and an image circle 15, which is equipped with a plurality of cores 12, a cladding parts 13, each cladding part 13 surrounding each core 12, and light-shield part 14 formed between these cladding parts 13 surrounding cores 12. The image circle 15 is covered with the jacket 4.

The above-mentioned core 12 has a graded-type refractive index distribution. The cladding part 13 has a low refractive index and has a flat distribution. Furthermore, the light-shield part 14 has a graded-type refractive index distribution and has a higher refractive index than the cladding part 13.

As the material of the each part, for example, $GeO_2$-doped $SiO_2$ is used for the core 12, fluorine (F) and/or $B_2O_3$-doped $SiO_2$ is used for the cladding part 13, and fluorine and/or $B_2O_3$-doped $SiO_2$ is used for the light-shield part 14.

In the image fiber 11, since the light-shield part 14 having a graded-type refractive index distribution is formed between these cladding parts 13 surrounding the cores 12, unwanted light such as stray light on the cladding, leaked light from the core, and the like is confined within the light-shield part 14, so that there is little chance of the light entering into images transmitted from the end face of the objective side to the end face of the ocular side through the cores 12. Thus, the contrast in the transmitted images is improved.

In order to prepare the image fiber 11 having a refractive index distribution shown in FIG. 2, at first, an optical fiber strand 18, which is equipped with a core 12, a cladding part 13 disposed at the peripheral surface of the core 12, and a gradually-increasing refractive-index part 17 disposed at the outer peripheral surface of the cladding part 13 is prepared. The core 12 has a graded-type refractive index distribution and the cladding part 13 has a flat refractive index distribution. A plurality of the optical fiber strands 18 are bundled and arranged into a jacket tube to make an image fiber preform. The image fiber preform is melt-drawn from an edge thereof, thus making the image fiber 11. During melt-integration, the gradually-increasing refractive index part 17 for each optical fiber strand 18, contacts the others, and they fuse to form the light-shield part 14 having a graded-type refractive index distribution.

An example of process for preparing the above-mentioned optical fiber strand 18 is disclosed hereinafter.

Figure 3:
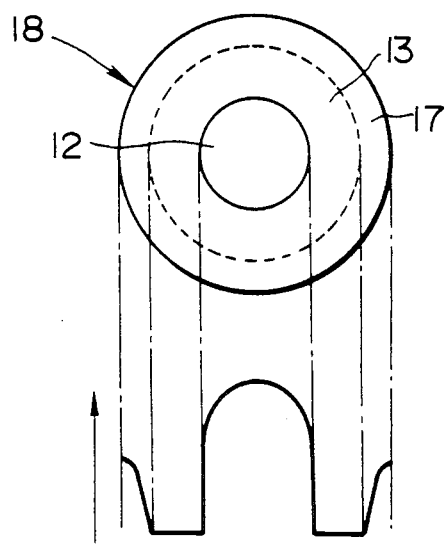
FIG. 3 is a cross sectional view of an optical fiber strand appropriately used for producing an image fiber of the present invention and a schematic representation illustrating the refractive index distribution thereof.

A porous parent material composed of $GeO_2$-doped $SiO_2$ is prepared by using the VAD (vapor-phase axial deposition) method, or a transparent glass parent material is prepared by dehydration if necessary, thus, forming a core part which has a graded-type refractive index distribution. Subsequently, fluorine (F) and/or $B_2O_3$ doped $SiO_2$ is deposited on either of the parent materials (porous parent material and transparent glass parent material) by the plasma CVD (chemical vapor deposition) method, for example, to form the transparent cladding part 13 and the gradually-increasing refractive-index part 17. In order to form the cladding part 13, the concentration of fluorine (F) and/or boron oxide ($B_2O_3$) in the deposit is maintained constant. In order to form the gradually-increasing refractive-index part 17, the concentration of fluorine (F) and/or boron oxide ($B_2O_3$) in the deposit is gradually decreased. The resulting transparent glass parent-material is drawn to prepare the F-doped and/or $B_2O_3$-doped optical fiber strand 18 for use in an image fiber, which has the refractive index distribution shown in FIG. 3.

A plurality of these optical fiber strands 18 are bundled and arranged in a quartz tube to prepare a preform. The preform is melt-drawn from an edge thereof to obtain the image fiber 11.

When a F-doped optical fiber strand is used as the optical fiber strand arranged in the quartz tube for the above-mentioned preform, the F-doped optical fiber strand is prepared from an optical fiber rod having a core and a cladding surrounding the core, the cladding being doped uniformly with fluorine. The optical fiber rod is subjected to heat treatment so that the fluorine doped in the outer peripheral surface of the silica glass cladding Of the optical fiber rod evaporates and melt-drawn. A plurality of the F-doped optical fiber strands, thus obtained, are closely arranged in the quartz tube to form the above-mentioned preform. If the heat treatment is omitted, the cladding surface of the optical fiber strand is subjected to an etching by the fluorine while the quartz tube including the optical fiber strands is melt-drawn to generate $SiF_4$ gas which will remain as bubbles in the produced image fiber and result in a reduction of mechanical strength thereof. The condition of the heat treatment process is at a temperature generally in the range of 1600° C. to 1800° C. for several hours. Under such conditions, the fluorine in the outer peripheral surface of the the cladding arranged in the quartz glass tube is evaporated sufficiently and the preform is not deformed.

Furthermore, as only the fluorine in the vicinity of the periphery of the cladding is removed, the refractive index difference between the core refractive index and the cladding refractive index is maintained. Therefore, the image is not hindered.

EXAMPLE 1

An image fiber having a refractive index distribution shown in FIG. 2 was prepared. An optical fiber strand (optical fiber material) in which the core and the light-shield part thereof had the graded-type refractive index distribution shown in FIG. 3 was used: The following core, cladding part, and gradually increasing refractive-index part were used.

Core: $GeO_2$-doped $SiO_2$; core diameter of 100 μm; and relative refractive index difference of +3.0%.

Cladding part: (F, $B_2O_3$)-doped $SiO_2$; thickness of 25 μm; and relative refractive index difference of −1.0%.

Gradually-increasing refractive-index part: (F, $B_2O_3$)-doped $SiO_2$; thickness of 5 μm; and maximum relative refractive index difference of −1.0%.

A bundle of 3000 of these optical fiber strands was closely arranged in a quartz tube and melt-drawn to prepare an image fiber according to the present invention.

As a comparative example, another optical fiber strand the same as the above-mentioned material of the present invention was prepared. The comparative optical fiber strand had a core having a graded-type refractive index distribution and a cladding, as well as a high-refractive index part composed of $SiO_2$ having a step-type refractive index distribution. The high-refractive index part surrounded the outer peripheral surface of the cladding part. Subsequently, by using the previously-described procedure, the comparative image fiber composed of cores, each core having graded-type refractive index distribution and a support layer having step-type refractive index distribution, as shown in FIG. 8, was prepared.

The contrast of the images transmitted through the optical fiber of the present invention was compared with that of the comparative one, using the MTF method. It was confirmed that the contrast of the images transmitted through the optical fiber of the present invention were improved compared with those of the comparative example by about 1.5 times.

EXAMPLE 2

Figure 4:
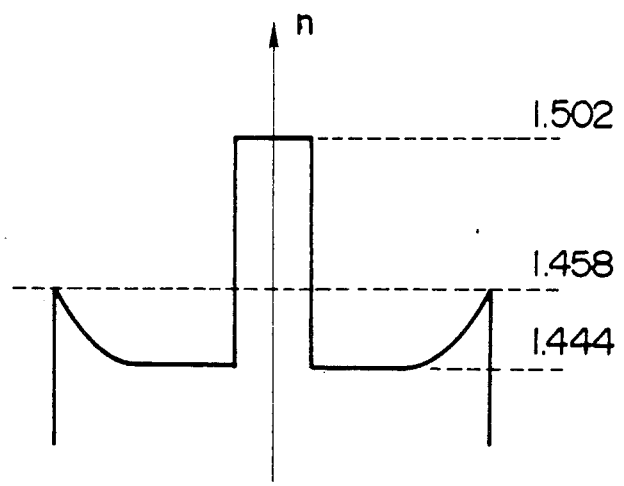
FIG. 4 is a schematic representation illustrating the refractive index distribution of a starting material of an image fiber used in the present invention.

A rod (outer diameter: 30 mm) for use in an image fiber having a step-type refractive index distribution was prepared. The rod had cladding having a 3 mol % F-doped $SiO_2$ glass (refractive index: 1.444) disposed around a 30 mol % $GeO_2$-doped $SiO_2$ glass rod (diameter: 20 mm; refractive index: 1.502) for a core. Subsequently, the rod was placed in an electric furnace at a temperature of 1600° C. to 1800° C. for 6 hours. FIG. 4 shows the obtained refractive index distribution of the starting material, in which the refractive index of the cladding periphery gradually increased outwardly, eventually attaining the same refractive index as $SiO_2$ at the outer peripheral surface thereof. Next, the parent material was melt-drawn from an edge to form an optical fiber strand having a core diameter of 133 μm and an outer diameter of 200 μm. Six thousand of optical fiber strands were prepared by cutting the obtained original fiber strand into pieces. Subsequently, these optical fiber strands were bundled and arranged in a 20 mm-diameter quartz glass tube to form an image fiber preform. Then, an edge of the preform heated at 1900° C. was melt-drawn to produce a 500 μm-diameter image fiber. Microscopic inspection for the presence of bubbles inside the image fiber revealed 1 bubble per 10 meters of the image fiber. This, indicates a remarkable improvement over the conventional image fiber having 5 bubbles per 10 meters. The resolution was inspected as a 35 line pair which was by no means inferior to the conventional resolution.

The fiber strand having the refractive index distribution as shown in FIG. 4 may be obtained by heating an outer peripheral surface of a quartz tube in which a plurality of fiber strands comprising cores and claddings uniformly doped with fluorine, each cladding surrounding each cladding, are arranged.

What is claimed is:

1. An image fiber preform for use in an image fiber comprising:
   (a) a plurality of optical fiber strands, each optical fiber strand including a silica glass based core which contains a dopant for increasing a refractive index of the core and a silica glass based cladding surrounding the silica glass based core, the silica glass cladding containing a fluorine dopant for decreasing a refractive index of the cladding, the cladding having an outer peripheral surface; and
   (b) a quartz tube in which the optical fibers are closely arranged;
   wherein the cladding has a concentration of the fluorine dopant which decreases radially outward toward the outer peripheral surface of the cladding.

2. An image fiber preform as recited in claim 1, wherein the fluorine dopant of the cladding is absent at the outer peripheral surface of the cladding and the refractive index of the outer peripheral surface of the cladding is the same as a refractive index of silica glass ($SiO_2$).

3. A process for preparing an image fiber preform for use in an image fiber, comprising the steps of:
   (a) forming a silica glass based core which contains a dopant for increasing a refractive index of the core;
   (b) subsequently, forming a silica glass based cladding which surrounds the silica glass based core and which has an outer peripheral surface to form an optical fiber rod, the silica glass based cladding being doped uniformly with fluorine which decreases a refractive index of the cladding;
   (c) subsequently, subjecting the optical fiber rod to heat treatment so that the fluorine doped in the outer peripheral surface of the silica glass cladding of the optical fiber rod evaporates;
   (d) subsequently, subjecting the optical fiber rod to melt-drawing operation to form an optical fiber strand;
   (e) subsequently, preparing a bundle of a plurality of the optical fiber strands;
   (f) subsequently, arranging the bundle closely in a quartz tube to form a preform.

4. A process for preparing an image fiber preform recited in claim 3, wherein in the heat treatment step (c), the outer peripheral surface of the silica glass based cladding is heated until the fluorine doped in the outer peripheral surface of the silica glass based cladding is absent.

5. An image fiber comprising silica glass based cores containing a dopant for increasing a refractive index of the core and silica glass based cladding parts containing a dopant for decreasing a refractive index of the cladding, and a light-shield part, the light-shield part being disposed between these cladding parts surrounding the cores, wherein the light-shield part has a non-step type of refractive index distribution.

6. An image fiber recited in claim 5, wherein the light-shield part has a graded-type refractive index distribution.

7. An image fiber as recited in claim 5, wherein the light-shield part has the non-step type of refractive index distribution in which the maximum refractive index thereof is larger than a refractive index of the cladding and smaller than the refractive index of the core.

8. A process for preparing an image fiber, comprising the steps of:
   (a) preparing a plurality of optical fiber strands, each fiber strand comprising a core, a cladding part surrounding the core, and a light-shield part surrounding the cladding part, the light-shield part having a refractive index gradually increasing radially outward so that the maximum refractive index thereof is higher than a refractive index of the cladding;
   (b) subsequently, arranging closely the optical fiber strands in a quartz tube to form a preform;
   (c) subsequently, heating the preform from an edge thereof; and
   (d) subsequently, subjecting the preform to melt-drawing operation to form an image fiber.

9. An image fiber preform for use in an image fiber comprising:
   (a) a plurality of optical fiber strands, each optical fiber strand including a silica glass based core which contains a first dopant for increasing a refractive index of the core, a silica glass based cladding containing a second dopant for decreasing a refractive index of the cladding, and a light-shield part surrounding the silica glass based cladding, the light-shield part containing a third dopant, wherein the light-shield part has a non-step type of refractive index distribution which gradually increases radially outwardly so that the maximum refractive index thereof is larger than a refractive index of the cladding and smaller than the refractive index of the core; and
   (b) a quartz tube in which the optical fibers are closely arranged.

10. A process for preparing an image fiber preform for use in an image fiber, comprising the steps of:
    (a) forming a silica glass based core which contains a dopant for increasing a refractive index of the core;
    (b) subsequently, forming a silica glass based cladding which surrounds the silica glass based core, the silica glass based cladding containing a second dopant for decreasing a refractive index of the cladding;
    (c) subsequently, forming a light-shield part surrounding the silica glass based cladding to form an optical fiber rod, the light-shield part containing a third dopant, wherein the light-shield part has a non-step type of refractive index distribution which is smaller than the refractive index of the core and larger than the refractive index of the cladding;
    (d) subsequently, subjecting the optical fiber rod to a melt-drawing operation to form an optical fiber strand;
    (e) subsequently, preparing a bundle of a plurality of the optical fiber strands; and
    (f) subsequently, arranging the bundle closely in a quartz tube to form a preform.

* * * * *